United States Patent [19]

Decroix

[11] Patent Number: 4,650,820

[45] Date of Patent: * Mar. 17, 1987

[54] BITUMEN-POLYMER COMPOSITIONS FOR THE PREPARATION OF ROAD SURFACE BINDERS

[75] Inventor: Jean-Claude Decroix, Arras, France

[73] Assignee: Societe Chimique des Charbonnages, Paris, France

[*] Notice: The portion of the term of this patent subsequent to May 29, 2001 has been disclaimed.

[21] Appl. No.: 550,556

[22] Filed: Nov. 14, 1983

[30] Foreign Application Priority Data

Nov. 17, 1982 [FR] France .................................. 82 19200

[51] Int. Cl.$^4$ .......................... C08L 95/00; E01C 7/26
[52] U.S. Cl. ........................................ 524/69; 524/66; 404/75
[58] Field of Search ................... 524/69, 66; 525/54.5; 404/75

[56] References Cited

U.S. PATENT DOCUMENTS

| | | | |
|---|---|---|---|
| 3,249,567 | 5/1966 | Vigneault | 524/69 |
| 3,531,426 | 9/1970 | Shim et al. | 524/69 |
| 3,634,293 | 1/1972 | Benitz | 524/69 |
| 4,425,453 | 1/1984 | Hunter | 524/69 |
| 4,451,598 | 5/1984 | Decroix | 524/69 |

FOREIGN PATENT DOCUMENTS 1644771  4/1971  Fed. Rep. of Germany.

Primary Examiner—Allan M. Lieberman
Attorney, Agent, or Firm—Finnegan, Henderson, Farabow, Garrett & Dunner

[57] ABSTRACT

The present invention provides a bitumen-polymer composition comprising 95 to 99% by weight of a bitumen and 1 to 5% by weight of a terpolymer having a melt index between 5 and 50 dg/min. The terpolymer comprises 88 to 98.7 mol % of units derived from ethylene; 1 to 10 mol % of units derived from at least one ester selected from the group consisting of alkyl acrylates and methacrylates, the alkyl group having from 1 to 6 carbon atoms; and 0.3 to 3 mol % of units derived from maleic anhydride. The bitumen-polymer composition is used in the preparation of road surface binders.

10 Claims, No Drawings

BITUMEN-POLYMER COMPOSITIONS FOR THE PREPARATION OF ROAD SURFACE BINDERS

FIELD OF THE INVENTION

The present invention relates to bitumen-polymer compositions. More particularly, it relates to a bitumen-polymer composition that can be used in the preparation of road-surface binders.

BACKGROUND OF THE INVENTION

Previous bitumen compositions have various kinds of polymers added to the bitumen to improve the cohesiveness and adhesiveness of a road-surface binder made from the bitumen composition. For example, German Pat. No. 1,644,771 describes a composition comprising up to 95% by weight of an aromatic petroleum asphalt and at least 5% by weight of a copolymer of ethylene and an acrylic or methacrylic acid ester that contains 10 to 40% by weight of an ester.

The roadwork, highway and construction industries are concerned with improving the performance characteristics of road-surface binders. In particular, it is desired that road-surface binders exhibit excellent cohesive and adhesive properties.

SUMMARY OF THE INVENTION

It is, therefore, an object of the present invention to provide a bitumen-polymer composition for the preparation of a high quality road surface binder.

It is an object of the present invention to provide a road surface binder having improved cohesive and adhesive properties.

To achieve these and other objectives, the present invention provides a bitumen-polymer composition comprising 95 to 99% by weight of a bitumen and 1 to 5% by weight of a terpolymer having a melt index within the range of 5 to 50 dg/min. The terpolymer comprises 88 to 98.7 mol. % of units derived from ethylene; 1 to 10 mol. % of units derived from at least one ester selected from the group consisting of alkyl acrylates and methacrylates, the alkyl group having 1 to 6 carbon atoms; and 0.3 to 3 mol.% of units derived from maleic anhydride.

The bitumen-polymer composition of the present invention has properties that permit the preparation of a high quality road surface binder. The road surface binder, prepared from the bitumen-polymer composition of the present invention, has excellent cohesive and adhesive properties. The bitumen-polymer composition can be used, in particular, to prepare a road-surface compound or molten binder upon which chippings can be laid.

DESCRIPTION OF THE INVENTION

The present invention provides a bitumen-polymer composition comprising 95 to 99% by weight of a bitumen and 1 to 5% by weight of a terpolymer having a melt index within the range of 5 to 50 dg/min. The terpolymer comprises 88 to 98.7 mol.% of units derived from ethylene; 1 to 10 mol.% of units derived from at least one ester selected from the group consisting of alkyl acrylates and methacrylates, the alkyl group having 1 to 6 carbon atoms; and 0.3 to 3 mol.% of units derived from maleic anhydride.

The bitumens used in the bitumen-polymer composition have a pseudo-viscosity at 30° C. in the range of about 200 to 1000 seconds. The pseudo-viscosity measurement is determined in accordance with French standard specification T-66005. Alternatively, the bitumen can be a mixture that includes at most 50% by weight of a tar and at least 50% by weight of bitumen. The bitumen and tar mixture also has a pseudo-viscosity at 30° C., in accordance with French standard specification T-66005, of between 200 and 1000 seconds.

The terpolymers that can be used in the present bitumen-polymer composition have been described in French Pat. No. 2,498,609. The polydispersity index $M_w/M_n$ of the terpolymers is generally greater than 6. The terpolymers have a Vicat softening point between about 30° C. and 85° C. The Vicat softening point is about 30° C. when the terpolymers have a high proportion of comonomers. The Vicat softening point is nearer to 85° C. when the terpolymers have a low proportion of comonomers.

The terpolymers can optionally contain a fourth monomer, which can be copolymerised with the first three monomers. This fourth monomer can be selected from the group consisting of α-olefins, having from 3 to 8 carbon atoms; monoalkyl maleates and dialkyl maleates in which the alkyl groups have from 1 to 6 carbon atoms; vinyl acetate; and carbon monoxide. The fourth monomer can be present in an amount less than 5 mol % with the proportion of ethylene in the tetrapolymer being reduced accordingly relative to the amount of the fourth monomer.

The performance characteristics of the bitumen-polymer compositions are further improved by the addition of up to 1 part of an agent for thermally reversible cross-linking or modification per 100 parts by weight of the composition. The agent is selected from the group consisting of high molecular weight alcohols, a mono-alcoholamine, a di-alcoholamine, a tri-alcoholamine, and a polyhydric alcohol. An example of a high molecular weight alcohol is benzylalcohol. Examples of alcoholamines include monoethanolamine and diethanolamine. Ethylene glycol and pentaerythritol are examples of polyhydric alcohols that can be used in the compositions of the present invention.

The bitumen-polymer composition produced according to the present invention possesses excellent physical properties. More particularly, the composition had a breaking point or Fraass point below or equal to −23° C., as measured according to standard specification IP 80/53. Such properties demonstrate the suitability of the bitumen-polymer composition for the preparation of road-surface binders of excellent quality. These compositions can be applied, in particular, to the preparation of road-surfacing compounds or molten binders, on which chippings can be laid.

Following are examples of the present invention, which are intended to be merely exemplary of the present invention.

EXAMPLES 1 TO 3

Examples 1 to 3 contain a mixture (A1) consisting of 60% by weight of bitumen and 40% by weight of tar. The bitumen-tar mixture has a pseudo-viscosity at 30° C., according to French Standard Specification T-66005, of 400 seconds.

Examples 1 to 3 also contain a terpolymer (B1) comprising 90.5 mol % of units derived from ethylene, 8.5 mol% of units derived from ethyl acrylate and 1.0 mol. % of units derived from maleic anhydride. This terpolymer (B1) has a melt index, as measured according to ASTM D 1238-73, of 38 dg/min; a polydispersity index Mw/Mn equal to 19; and a density of 0.948 g/cm³.

Bitumen-polymer compositions comprising X% of the terpolymer (B1) and (100-X)% of the bitumen-tar mixture (A1) are produced by homogeneous mixing. The pseudo-viscosities of the resulting compositions are measured at 30° C. in accordance with French Standard Specification T-66005. Additionally, the breaking points, as provided by standard specification IP 80/53, are also measured in degrees centigrade.

The bitumen-polymer compositions and their measured properties are indicated in Table I. These compositions can be used for the preparation of road-surfacing compounds.

TABLE I

| Example No. | 1 | 2 | 3 |
| --- | --- | --- | --- |
| X (%) | 1 | 2 | 2 |
| Pseudo-viscosity (seconds) | 555 | 700 | 1,920 |
| Breaking point (°C.) | −23.5 | −27.5 | −27.0 |

EXAMPLES 4 TO 6

Example 4 to 6 contain a mixture (A2) consisting of 60% by weight of bitumen and 40% by weight of tar. The bitumen-tar mixture has a pseudo-viscosity at 30° C., according to French Standard Specification T-66005, of 250 seconds. Examples 4 to 6 also contain the same terpolymer (B1) as that which is used in Examples 1 to 3.

The bitumen-polymer compositions comprising X% of the terpolymer (B₁) and (100-X%) of the bitumen-tar mixture (A2) are produced by homogeneous mixing. The pseudo-viscosity at 30° C. and the breaking point of the compositions are measured, as in Examples 1 to 3. The values of these measurements appear in Table II.

TABLE II

| Example No. | 4 | 5 | 6 |
| --- | --- | --- | --- |
| X (%) | 3 | 4 | 4.5 |
| Pseudo-viscosity (seconds) | 930 | 1,740 | 2,160 |
| Breaking point (°C.) | −28 | −26.5 | −25 |

These compositions can be used for the preparation of road surfacing compounds.

EXAMPLE 7

Example 7 uses a terpolymer (B2) comprising 96.7 mol % of units derived from ethylene, 2.3 mol % of units derived from ethyl acrylate and 1 mol % of units derived from maleic anhydride. The terpolymer (B₂) has a melt index, measured according to ASTM D 1238-73, of 6.4 dg/min; a polydispersity index Mw/Mn equal to 7.4; and a Vicat softening point of 73° C.

A bitumen-polymer composition, having good properties for the preparation of road-surfacing compounds, was produced from 3% by weight of the terpolymer (B2) and 97% by weight of the mixture (A1), which was used in Examples 1 to 3.

Other embodiments of the invention will be apparent to one skilled in the art from a consideration of the specification or the practice of the invention disclosed herein. It is intended that the specification and examples be considered as exemplary only, with the true scope and spirit of the invention being indicated by the claims.

What is claimed is:

1. A bitumen-polymer composition comprising:
   (a) 95 to 99% by weight of a bitumen, said bitumen having a pseudo-viscosity at 30° C. in the range of 200–1,000 seconds; and
   (b) 1 to 5% by weight of a terpolymer having a melt index within the range of 5 to 50 dg/min, the terpolymer comprising 88 to 98.7 mol. % of units derived from ethylene, 1 to 10 mol. % of units derived from at least one ester selected from the group consisting of alkyl acrylates and methacrylates, the alkyl group having 1 to 6 carbon atoms, and 0.3 to 3 mol. % of units derived from maleic anhydride.

2. The bitumen-polymer composition according to claim 1, wherein the bitumen is a mixture of at least 50% by weight of bitumen and at most 50% by weight of a tar.

3. The bitumen-polymer composition according to claim 1, wherein the terpolymer has a polydispersity index of more than 6.

4. The bitumen-polymer composition according to claim 1, wherein the terpolymer has a Vicat softening point of between 30° C. and 85° C.

5. The bitumen-polymer composition according to claim 1, wherein the terpolymer further includes a fourth monomer selected from the group consisting of α-olefins having from 3 to 8 carbon atoms, monoalkyl maleates and dialkyl maleates in which the alkyl groups have from 1 to 6 carbon atoms, vinyl acetate, and carbon monoxide.

6. The bitumen-polymer according to claim 5, wherein the fourth monomer is present in an amount less than 5 mol %.

7. The bitumen-polymer composition according to claim 1, further comprising less than 1 part by weight of an agent for thermally reversible cross-linking or modification per 100 parts by weight of the bitumen-polymer composition, said agent being selected from the group consisting of high molecular weight alcohols, mono-alcohol-amines, di-alcohol amines, tri-alcohol-amines, and polyhydric alcohols.

8. The bitumen-polymer composition according to claim 1, wherein the bitumen-polymer has a breaking point below or equal to −23° C.

9. A bitumen-polymer composition comprising:
   (a) 96 to 99% by weight of a bitumen, said bitumen having a pseudo-viscosity at 30° C. in the range of 200–1,000 seconds; and
   (b) 1 to 4% by weight of a terpolymer having a melt index within the range of 5 to 50 dg/min, the terpolymer comprising 88 to 98.7 mol. % of units derived from ethylene, 1 to 10 mol. % of units derived from at least one ester selected from the group consisting of alkyl acrylates and methacrylates, the alkyl group having 1 to 6 carbon atoms, and 0.3 to 3 mol. % of units derived from maleic anhydride.

10. Applying as a road-surface binder a bitumen-polymer composition to a road-surface substrate, said bitumen-polymer composition comprising:
   (a) 95 to 99% by weight of a bitumen, said bitumen having a pseudo-viscosity at 30° C. in the range of 200–1,000 seconds; and
   (b) 1 to 5% by weight of a terpolymer having a melt index within the range of 5 to 50 dg/min, the terpolymer comprising 88 to 98.7mol. % of units derived from ethylene, 1 to 10 mol. % of units derived from at least one ester selected from the group consisting of alkyl acrylates and methacrylates, the alkyl group having 1 to 6 carbon atoms, and 0.3 to 3 mol. % of units derived from maleic anhydride.

* * * * *